Nov. 28, 1933.  J. A. MENDEL  1,937,431

PROCESS OF MAKING CABLE TERMINALS

Filed Dec. 14, 1931

Inventor:
Joseph A. Mendel,
by Charles E. Muller
His Attorney.

Patented Nov. 28, 1933

1,937,431

UNITED STATES PATENT OFFICE 1,937,431

PROCESS OF MAKING CABLE TERMINALS

Joseph A. Mendel, Pittsfield, Mass., assignor to General Electric Company, a corporation of New York Application December 14, 1931
Serial No. 580,773

2 Claims. (Cl. 29—155.55)

My invention relates to cable terminals and to methods of forming them. If a stranded cable provided with a terminal is to carry a heavy current it is important that there be as little resistance as possible between the cable and its terminal or objectionally high temperatures may be produced. It is often of importance too that the attachment of the terminal to the cable be mechanically strong so that the terminal cannot become loose or be pulled from the cable. The general object of the present invention is to provide an improved method for forming a cable terminal having these advantages.

Figure 1:
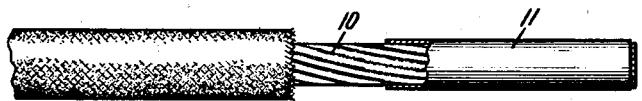
Figure 2:
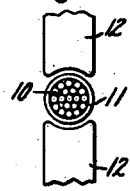
Figure 3:
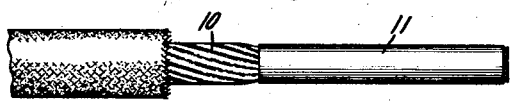
Figure 4:
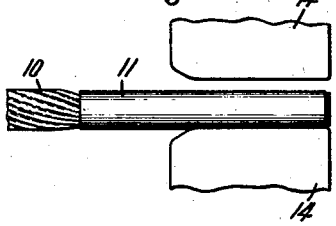
Figure 5:
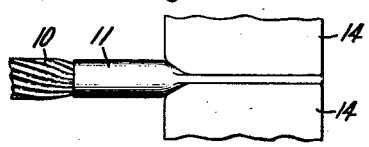
Figure 6:
Figure 7:
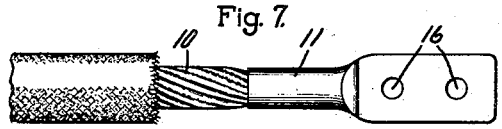
Figure 8:
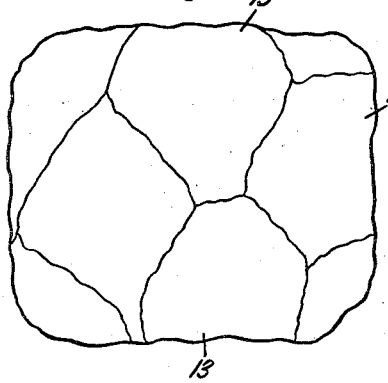
Figure 9:
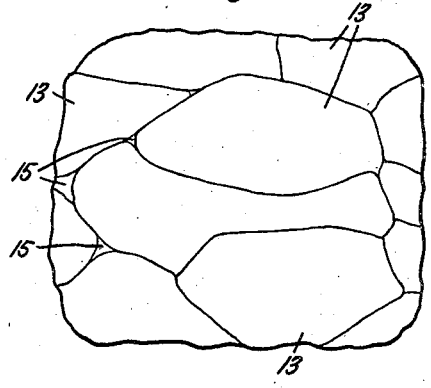

The objects and advantages of the invention will be further explained in the following description taken in connection with the accompanying drawing in which Fig. 1 shows an end of a stranded cable with a metal tube from which a terminal may be formed in accordance with the invention; Fig. 2 is an end view of the cable and tube between a pair of swaging dies; Fig. 3 is a view of the cable and tube after the tube has been swaged; Fig. 4 is a view of the cable and the swaged tube with the outer portion of the tube between a pair of dies for flattening the tube; Fig. 5 shows the cable and tube with the flattening dies after the tube has been flattened; Fig. 6 shows the cable and flattened tube removed from the dies; Fig. 7 is another view of the cable and flattened tube; and Figs. 8 and 9 are explanatory photomicrographs of sections of the finished terminal applied to the cable.

Like reference characters indicate similar parts in the different figures of the drawing.

The invention will be explained in connection with a cable 10 formed of round tinned strands of metal, preferably copper. A metal tube 11, also preferably of copper, which fits closely about the cable 10, is slipped onto the end of the cable until the cable extends entirely through the tube. The tube 11 with the enclosed cable end is then swaged throughout its length by a pair of swaging dies 12, shown in Fig. 2, until the cable strands in the tube have been distorted and pressed together with no spaces left between them. Fig. 8 is a copy of a photomicrograph showing how the cable strands 13 are compacted tightly together by the swaging of the tube 11. The swaging of the tube 11 reduces its diameter, without changing its shape as indicated in Fig. 3.

The outer end portion of the swaged tube and cable is next placed between flat dies 14, as shown in Fig. 4, and flattened by heavy pressure, as shown in Fig. 5. This further distorts and flattens the strands of the cable in the flattened part of the tube. Fig. 9 is a copy of a photomicrograph showing how the strands 13 have been compacted and flattened by the swaging and flattening dies. The individual strands 13, shown in Figs. 8 and 9, were tinned, and Fig. 9 shows how the tin 15 has been squeezed out from between the strands where the pressure was greatest and has collected along the edges of some of the strands where the pressure was not so great. The photomicrographs show that in both the rounded and flattened portions of the finished terminal, two views of which are shown in Figs. 6 and 7, no open spaces whatever are left between the strands. This keeps out liquids or gases which might cause corrosion and provides an extremely strong mechanical union between the cable and terminal. It has been found that the flattening of the terminal produces much more perfect results in a terminal which has been previously swaged than in one which has not been swaged. The flattened portion of the terminal may have openings 16 formed in it for bolts if desired, as shown in Fig. 7.

The invention has been explained by describing and illustrating a cable terminal formed in accordance with the invention and by explaining the steps of the process for forming the terminal but it will be apparent that changes may be made without departing from the spirit of the invention and the scope of the appended claims.

What I claim as new and desire to secure by Letters Patent of the United States is:

1. The process of forming a terminal on a stranded cable, said process including the steps of placing a metal tube on an end of said cable, swaging at least a portion of said tube to reduce its diameter without changing its shape, continuing said swaging until the strands fill the space within the swaged portion of the tube, and flattening a swaged portion of the tube.

2. The process of forming a terminal on a stranded cable, said process including the steps of placing a metal tube on an end of said cable, swaging said tube throughout its length to reduce its diameter without changing its shape, continuing said swaging until the strands fill the space within the tube, and flattening a swaged portion of the tube.

JOSEPH A. MENDEL.